US011279410B2

(12) United States Patent
Zeitouni et al.

(10) Patent No.: US 11,279,410 B2
(45) Date of Patent: Mar. 22, 2022

(54) VEHICLE COMPRISING A SMALL-OVERLAP FRONTAL-IMPACT ABSORPTION DEVICE

(71) Applicant: PSA AUTOMOBILES SA, Poissy (FR)

(72) Inventors: Richard Zeitouni, Bois d'Arcy (FR); Marc Peru, Chatenay-Malabry (FR); Frédéric Coiffier, Montlhery (FR)

(73) Assignee: PSA AUTOMOBILES SA, Poissy (FR)

( * ) Notice: Subject to any disclaimer, the term of this patent is extended or adjusted under 35 U.S.C. 154(b) by 22 days.

(21) Appl. No.: 16/640,328

(22) PCT Filed: Aug. 27, 2018

(86) PCT No.: PCT/FR2018/052102
§ 371 (c)(1),
(2) Date: Feb. 19, 2020

(87) PCT Pub. No.: WO2019/063895
PCT Pub. Date: Apr. 4, 2019

(65) Prior Publication Data
US 2020/0353985 A1 Nov. 12, 2020

(30) Foreign Application Priority Data

Sep. 27, 2017 (FR) .................................... 1758935

(51) Int. Cl.
*B62D 21/15* (2006.01)
*B62D 35/02* (2006.01)
(52) U.S. Cl.
CPC ......... *B62D 21/155* (2013.01); *B62D 21/152* (2013.01); *B62D 35/02* (2013.01)

(58) Field of Classification Search
CPC ........ B62D 21/08; B62D 21/11; B62D 21/15; B62D 21/152; B62D 21/155; B62D 35/02
(Continued)

(56) References Cited

U.S. PATENT DOCUMENTS

| 8,801,080 B2 * | 8/2014 | Uhlenbruch ......... B62D 21/155 296/187.09 |
| 2011/0133513 A1 * | 6/2011 | Stephens .............. B60H 3/0616 296/190.09 |

(Continued)

FOREIGN PATENT DOCUMENTS

| DE | 102006013548 A1 | 10/2007 |
| DE | 102009041771 A1 | 3/2011 |

(Continued)

OTHER PUBLICATIONS

International Search Report for PCT/FR2018/052102 dated Dec. 11, 2018.
Written Opinion for PCT/FR2018/052102 dated Dec. 11, 2018.

*Primary Examiner* — Jason S Daniels
(74) *Attorney, Agent, or Firm* — Sandberg Phoenix & von Gontard, P.C.

(57) ABSTRACT

The invention relates to a motor vehicle (1) comprising two longitudinal members (3) and a cradle (9) from where there extend at the front two extensions (11) separated by a gap, each extension (11) extending below one of the longitudinal members (3) and being connected to said longitudinal member (3) by a support element (7), the vehicle (1) being characterized in that it additionally comprises an absorption device (13) arranged in said gap and between said extensions (11).

6 Claims, 3 Drawing Sheets

(58) Field of Classification Search
USPC .......................................... 296/187.09, 187.1
See application file for complete search history.

(56) References Cited

U.S. PATENT DOCUMENTS

| | | | | |
|---|---|---|---|---|
| 2013/0270029 A1* | 10/2013 | Young | ................... | B62D 21/155 |
| | | | | 180/274 |
| 2015/0298741 A1* | 10/2015 | Winberg | .............. | B62D 21/155 |
| | | | | 296/187.09 |
| 2015/0314807 A1* | 11/2015 | Nusier | ................... | B62D 21/11 |
| | | | | 296/187.09 |

FOREIGN PATENT DOCUMENTS

| | | | | |
|---|---|---|---|---|
| DE | 102009058400 A1 | 6/2011 | | |
| EP | 1787894 A2 * | 5/2007 | ............. | B62D 21/11 |
| EP | 2210799 A1 | 7/2010 | | |
| FR | 2915167 A1 | 10/2008 | | |
| FR | 3092067 A1 * | 7/2020 | ............. | B62D 21/11 |

\* cited by examiner

VEHICLE COMPRISING A SMALL-OVERLAP FRONTAL-IMPACT ABSORPTION DEVICE

CROSS-REFERENCE TO RELATED APPLICATIONS

This application is the US National Stage under 35 USC § 371 of International Application No. PCT/FR2018/052102, filed 27 Aug. 2018 which claims priority to French Application No. 1758935 filed 27 Sep. 2017, both of which are incorporated herein by reference.

BACKGROUND

The invention is in the field of frontal impact absorption devices for vehicles, and more particularly in the field of small-overlap frontal impact absorption devices. The invention furthermore relates to a vehicle that is provided with an absorption device of this kind.

The front part of a vehicle generally comprises two structural elements, also referred to as front side members, which extend in the longitudinal direction of the vehicle, on either side of the engine. A bumper beam is fixed to the front of the side members, by means of absorbers (or "crash boxes") that are designed to be compressed in the event of a frontal impact of the vehicle, so as to absorb the forces. In the case of a violent impact, the side members will in turn be deformed in order to participate in the absorption of the forces.

Nowadays, the approval of motor vehicles comprises a frontal impact test that consists in propelling a vehicle against a deformable barrier at a speed of 64 km/h. During the test, the forces are distributed over approximately a half-width of the vehicle (40%). However, a test of this kind does not represent all cases of frontal impact, and in particular some more severe cases which are directed against a non-deformable object, such as a post, located only on one side of the vehicle. A new test for small-overlap frontal impact has therefore been established, and consists in propelling the vehicle against a non-deformable barrier at a speed of 64 km/h, and covering only 25% of the width of the vehicle. In the case of an impact of this kind, the front side member arranged on the side of the barrier will be compressed and bent on the inside of the vehicle. Thus, in a real situation, there is a risk that a barrier of this kind may reach the passenger compartment and injure the vehicle occupants. There is therefore a need to limit, or indeed prevent, the physical damage to the vehicle occupants in the event of a small-overlap frontal impact.

French Pat. No. FR2986490 describes a vehicle in which every side member comprises a reinforcement in the curved portion thereof that fits the shape of the raised portion of the board. The reinforcement may be straight or may have a curvature that is the opposite of the curvature of the portion. In the case of a frontal impact, the reinforcements allow for the bending of the side members to be reduced in the region of the portion, such that the side member remains in position and absorbs the forces.

French Pat. No. FR3001932 describes a front part of the body of a vehicle that is designed for a small-overlap frontal impact. For this purpose, the front part comprises a fixed reinforcement wedge, close to the front of one of the two front side members, on either side, between the front bumper and the front wheel. In the event of a frontal impact, the wedge presses against the front wheel and prevents rotation thereof, such that the wheel remains in line and loads the cross-member of the rear rocker panel in a stable manner. This has the effect of limiting the penetration of the barrier into the vehicle.

The devices are of interest, but unfortunately they do not make it possible to prevent bending of the side members on the inside of the vehicle in the event of a small-overlap frontal impact. There is therefore a need for a device that makes it possible to prevent, or at least limit, the risks of the side members bending on the inside of the vehicle in the event of a small-overlap frontal impact.

SUMMARY

The object is to overcome at least one of the problems encountered in the prior art, by proposing a novel vehicle that is designed to improve the resistance of the front side members to oblique forces in the event of a frontal impact of the vehicle.

For this purpose, a motor vehicle is disclosed comprising two side members and a cradle from which two extensions, separated by a gap, stretch towards the front, each extension stretching below one of the side members and being connected to the side member by a support element. The vehicle further comprises an absorption device that is arranged in the gap and between the two extensions.

As will have been understood from reading the definition given above, an absorption device is positioned between the two cradle extensions, such that oblique forces received by the extension are absorbed. The absorption device advantageously makes it possible to indirectly reinforce the resistance of the side members to oblique forces, by reinforcing the extensions that stretch below and are connected to the side members by support elements. It is therefore the assembly of the side member, the support element and the extension that is thus reinforced and will oppose the entry of a post, so as to protect the vehicle occupants. The absorption device thus provides the side members with a rigidity which furthermore makes it possible to cause the vehicle to veer away from the obstacle at the start of the impact, and thus to relieve the rear structure of the vehicle at the end of the impact. Indeed, in the event of a small-overlap frontal impact, the rigidity of the side members advantageously makes it possible for the vehicle not to wind around the obstacle, but rather to slide along the obstacle. As a result, the forces to which the entirety of the vehicle structure is subjected in the event of the impact are reduced. It is thus advantageously possible to relieve the structure of the vehicle which is subjected to less force.

According to a particular embodiment, the absorption device comprises at least one transverse member that stretches from one extension to the other, preferably until it is in contact with the extensions. As a result, the oblique forces applied against one of the two extensions are distributed to the other extension. Indeed, the other extension is not subjected to any force, and acts as a stable support for the members.

According to an embodiment, the transverse member or at least one of the transverse members is arranged so as to be non-perpendicular to the longitudinal axis of the vehicle, and/or the transverse member or at least one of the transverse members is arranged so as to be perpendicular to the longitudinal axis of the vehicle.

According to a preferred embodiment, the transverse member or at least one of the transverse members is arranged so as to be non-perpendicular with respect to the longitudinal axis of the vehicle. Preferably, the extensions comprise a front end, and the transverse member or at least one of the transverse members arranged so as to be non-perpendicular comprises an end that is arranged in the region of the front end of one of the extensions. As a result, the distribution of the forces occurs earlier, in the event of the penetration of a post on one side of the front face of a vehicle.

According to an embodiment, the transverse member or at least one of the transverse members is arranged so as to be perpendicular to the longitudinal axis of the vehicle. Preferably, the extensions comprise a front end, and the transverse member or at least one of the transverse members arranged so as to be perpendicular comprises two ends that are each arranged in the region of the front end of one of the extensions. Preferably again, since the support elements are connected by a front cross-member, the absorption device has a transverse member that is arranged so as to be perpendicular and which is in contact with the front cross-member. More preferably, the transverse member is fixed to the front cross-member. A design of this kind increases the rigidity of the absorption system, and thus the force-absorption capacity thereof.

According to a particular embodiment, the absorption device further comprises at least one of the members that is arranged so as to be in parallel with the longitudinal axis of the vehicle. Longitudinal members of this kind make it possible to prevent elements located in front of the gap separating the extension from penetrating into the vehicle, in particular in the event of larger-overlap frontal impact. Preferably, the absorption device further comprises a member that stretches from one extension to the other and that is arranged so as to be perpendicular to the longitudinal axis of the vehicle, against the cradle, and that is in contact with the longitudinal member or members. This design advantageously makes it possible to reinforce the supports of the longitudinal member or members. Preferably again, the at least one of the longitudinal members stretches along one of the extensions.

According to an embodiment, the absorption device comprises at least two transverse members and at least one intermediate member that stretches from one transverse member to the other. Alternatively, the intermediate member is arranged so as to be in parallel with the longitudinal axis of the vehicle.

According to an embodiment, the absorption device further comprises at least one intermediate member that stretches between one member and one extension.

According to a particular embodiment, the absorption device further comprises at least one intermediate member that stretches between one member and one extension, or between two members. The presence of intermediate members makes it possible to increase the rigidity of the absorption device, and thus the force-absorption capacity thereof.

Preferably, the member or at least one of the members is fixed to the extensions, preferably by means of fixing tabs. Preferably again, the fixing is achieved by means of screwing, in particular using at least one self-tapping screw. Using self-tapping screws makes it possible to facilitate the mounting of the members, since the screws do not require preliminary drilling and tapping on the extensions. Alternatively, the fixing is achieved by means of welding.

According to a particular embodiment, the member or at least one of the members is made of metal or a composite material. Preferably, the member or at least one of the members is made of steel or aluminum. The member or at least one of the members may possibly be made of a thermoplastic material.

According to a preferred embodiment, the device further comprises an underbody screen, and the member or at least one of the members is mounted on the screen or formed integrally with the screen. The device thus has a dual function of absorbing oblique forces and improving the aerodynamics of the vehicle. Indeed, the presence of a screen of this kind makes it possible to reduce the formation of air turbulence below the engine while the vehicle is moving. Furthermore, the presence of a screen of this kind makes it possible to increase the rigidity of the device, and thus the force-absorption capacity thereof.

Preferably, the underbody screen covers at least 30% of the dimensions of the gap separating the two extensions, furthermore preferably at least 50%, preferably at least 70%, more preferably at least 90%. According to a preferred embodiment, the underbody screen covers at least the dimensions of the gap separating the two extensions.

Preferably, the underbody screen comprises at least one lateral edge that borders one of the extensions and against which the member or at least one of the members rests.

Preferably again, since the extensions are fixed to fixing plates at the front, the underbody screen is fixed to at least one extension and/or to at least one fixing plate. Preferably, the fixing is achieved by means of screwing, in particular using at least one self-tapping screw. Fixing by means of self-tapping screws facilitates the mounting of the absorption device on the vehicle. Alternatively, the fixing is achieved by means of welding.

Preferably, the underbody screen is formed of a thermoplastic material or of a composite material. When the screen comprises at least one lateral edge that borders one of the extensions, it functions as a shock-absorber before the members are stressed. As a result, the absorption of forces by the device is improved. Furthermore, a screen of this kind provides acoustic insulation for the passenger compartment when objects such as chippings ride up towards the engine environment when the vehicle is moving. Indeed, in contrast with the metal elements that make up the engine environment, a screen made of a plastics material makes it possible to absorb sound vibrations produced by an impact.

Preferably, the screen comprises a network of ribs. A network of this kind makes it possible to increase the rigidity of the screen, and thus the rigidity of the absorption device. Preferably again, the network of ribs comprises a set of ribs in the form of a honeycomb.

An absorption device for a vehicle as defined above is also disclosed, wherein the absorption device comprises an underbody screen and at least one transverse member stretching from one edge to the other of the underbody screen, such that the transverse member or at least one of the transverse members is arranged so as to be non-perpendicular to the longitudinal axis of the vehicle, and/or the transverse member or at least one of the transverse members is arranged so as to be perpendicular to the longitudinal axis of the vehicle.

DESCRIPTION OF THE FIGURES

The invention will be better understood, and other aspects and advantages will become clear, upon reading the following description, given by way of example and with reference to the accompanying drawings, in which.

DETAILED DESCRIPTION

In the following description, the term "comprise" is synonymous with "include" and is not limiting, in that it allows for the presence of other elements in the vehicle of the absorption device to which it relates. It is understood that the term "comprise" includes the term "consist." The terms "front" and "rear," as well as the directions "longitudinal" and "transverse," are to be understood with respect to the general orientation of the vehicle. The terms "bottom" and "lower" indicate a position closer to the ground than the terms "top" and "upper," respectively. In the different figures, the same reference signs denote identical or similar elements.

Figure 1:
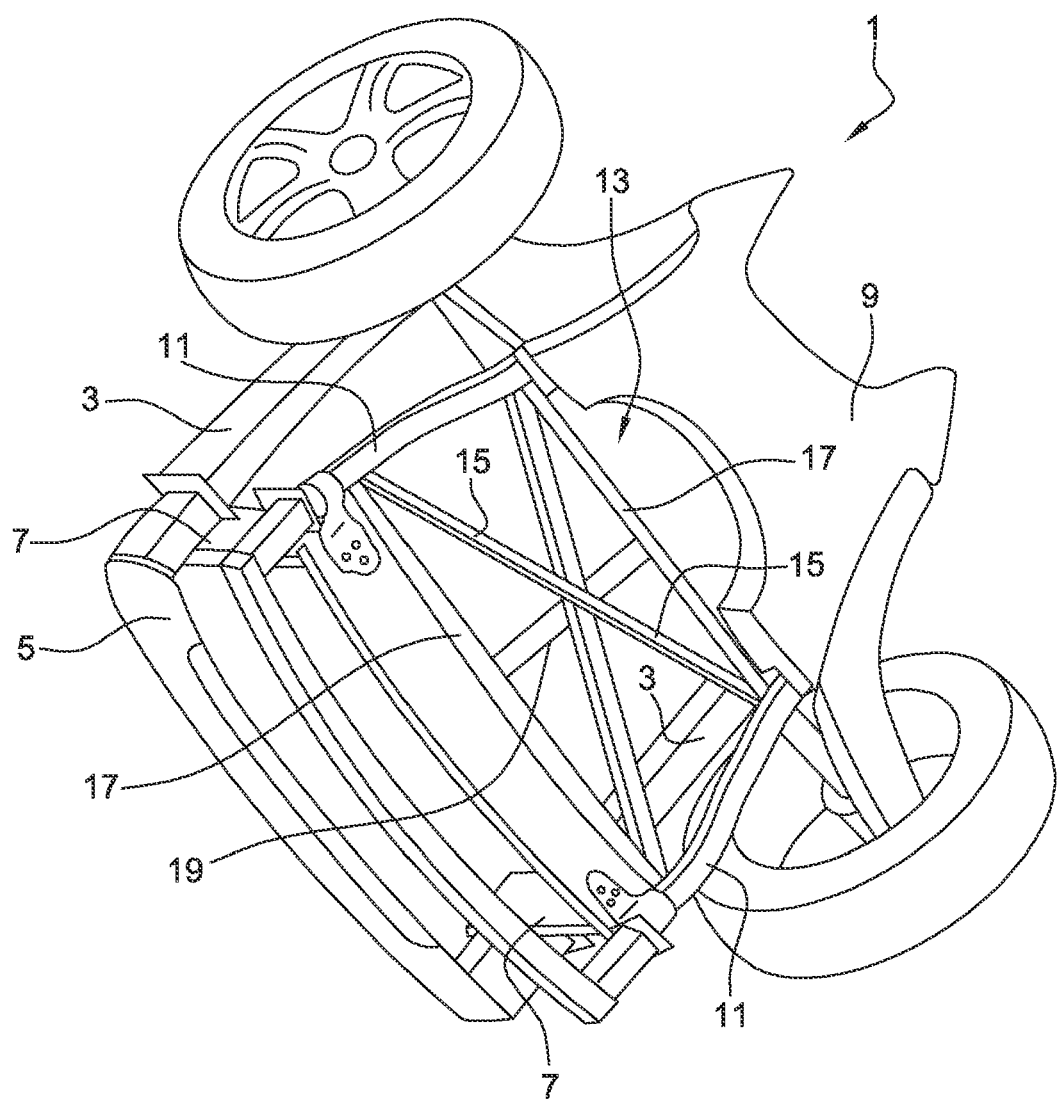
FIG. 1 is a view from below of a front part of a vehicle comprising an embodiment of an absorption device.

Reference is first made to FIG. 1, which is a view from below of a front part of a vehicle 1. The front part comprises two front side members 3 that extend in the longitudinal direction of the vehicle 1 and on either side of an engine (not shown). Absorbers, on which a bumper beam 5 is mounted, are provided in front of the side members 3. The bumper beam carries a bumper skin (not shown) which, in part, forms the front facade of the vehicle 1. Support elements 7, also referred to as the facade, are fixed to the front ends of the side members and support the front facade block (not shown) extending between the two support elements 7. The front facade block comprises a heat exchanger such as a radiator of an engine cooling circuit, or a supercharging air cooling circuit, or even a condenser of an air-conditioning circuit of the passenger compartment.

The vehicle further comprises a cradle 9 from which two extensions 11 extend forward, the front ends of the extensions being fixed to the support elements 7. The support elements 7 are connected, at the lower part thereof, by a front cross-member which is arranged in front of the extensions 11 and under the heat exchanger. Furthermore, the extensions 11 are separated by a gap and are each arranged below one of the two side members 3. The front ends of the extensions 11 are also fixed to fixing plates on which absorbers are mounted. The absorbers carry a second bumper bar or lower bumper bar.

The vehicle 1 comprises an absorption device 13 that is arranged in the gap separating the two extensions 11 so as to be in contact with the extensions 11. The absorption device makes it possible to absorb the oblique forces to which one of the two extensions 11 is subjected in the event of a small-overlap frontal impact. The rigidity of the extension 11 is thus improved, making it possible to restrict or even prevent the side member 3, arranged above, being bent towards the inside of the vehicle 1. This effect is achieved as a result of the mutual fixing of the side member 3 and the cross-member to the same support element 7. Advantageously, the positioning of the absorption device does not require modification of the vehicle 1, and can thus be easily integrated into vehicle during the assembly thereof.

According to an embodiment, the absorption device 13 comprises at least one transverse member (15, 17) that connects the two extensions 11. Thus, in the event of a small-overlap frontal impact, the forces to which one of the extensions 11 is subjected are transferred to the other extension 11. Since the other extension 11 is not subjected to frontal impact force, the invention allows for good use to be made of the rigidity thereof for absorbing the forces through the members.

According to an embodiment, the absorption device 13 comprises at least one transverse member 15 that is arranged so as to be non-perpendicular with respect to the longitudinal axis of the vehicle 1. Preferably, the front end of the transverse member or of at least one of the transverse members 15 that is arranged so as to be non-perpendicular is arranged in the region of the front end of the extension 11. As a result, the forces are distributed and absorbed as soon as possible in the kinematics of the frontal impact. Furthermore, and as shown, the rear end of the member 15 can be arranged in the region of the rear end of the other extension 11. Alternatively, the rear end can be arranged along the other extension, for example in the region of the center of the extension.

According to an embodiment of the invention, the absorption device 13 comprises at least one transverse member 17 that is arranged so as to be perpendicular to the longitudinal axis of the vehicle 1. A member of this kind also makes it possible to distribute the forces to which one of the extensions 11 is subjected, to the other extension 11. Preferably, the ends of the transverse member or of one of the transverse members 17 arranged so as to be perpendicular are arranged in the region of the front ends of the extensions 11. As is shown, the transverse member 17 can be in contact with the front cross-member connecting the two support elements 7, increasing the rigidity of the member, and thus the rigidity of the device. Preferably, the transverse member 17 is fixed to the front cross-member.

Preferably, the transverse members (15, 17) are distributed over the entire length of the extensions 11, so as to improve the distribution of forces.

According to an embodiment, the absorption device 13 further comprises at least one longitudinal member 19 that is arranged so as to be in parallel with the longitudinal axis of the vehicle 1. As a result, the absorption device 13 makes it possible to restrict, or even prevent, a movement of the front facade block in the event of a front impact, and contributes to the absorption of forces in the event of a larger-overlap frontal impact. Preferably, and as shown in FIG. 1, the absorption device 13 comprises a transverse member 17 that is arranged so as to be perpendicular and is arranged so as to be in contact with the cradle 9 and against which the longitudinal member or members 19 rest. Preferably, the longitudinal member or at least one of the longitudinal members borders one of the extensions. Preferably again, the member is in contact with the extension.

Figure 2:
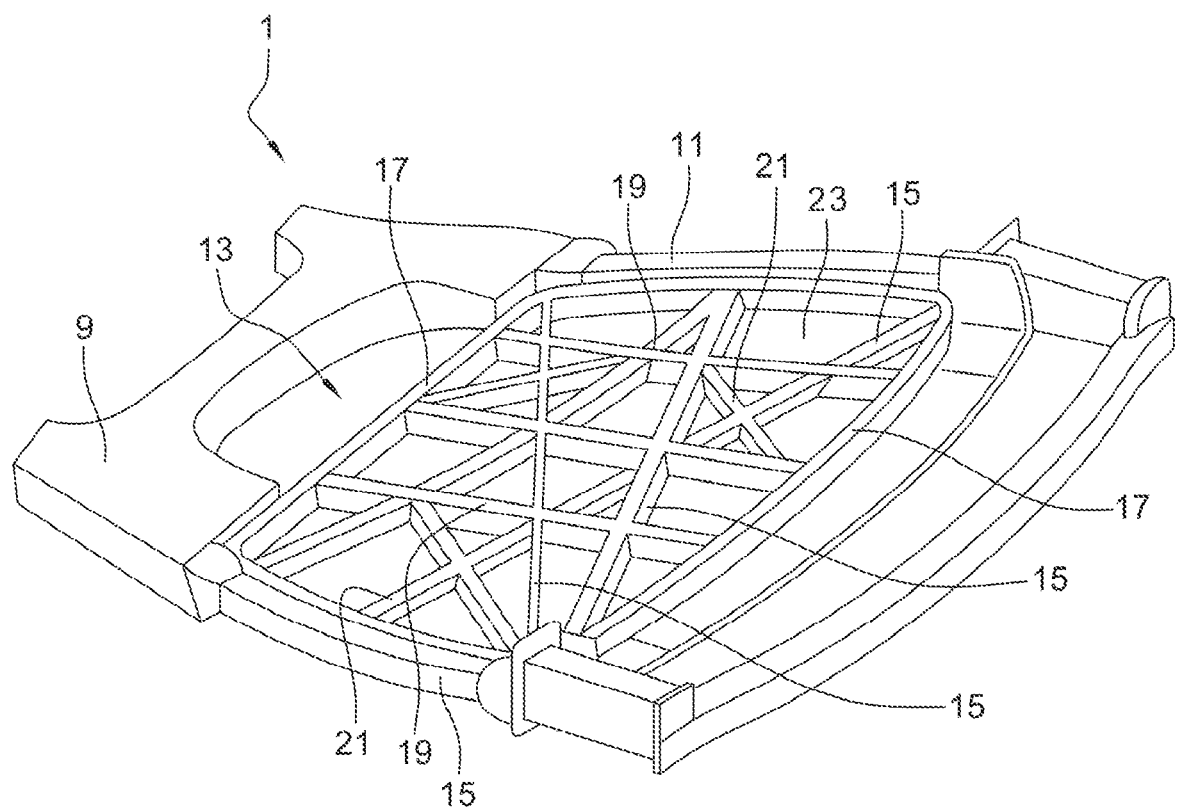
FIG. 2 is a side view of a front part of a vehicle comprising another embodiment of an absorption device.

With respect to FIG. 2, it can be seen that, according to a particular embodiment, the absorption device 13 further comprises at least one intermediate member 21 connecting one extension 11 and one member (transverse or longitudinal), or two members (transverse or longitudinal). The intermediate members 21 reinforce the rigidity of the device 3. Preferably, all the members (15, 17, 19, 21) form a lattice.

The different members (transverse, longitudinal and intermediate) are preferably fixed to the extensions 11 when in contact therewith. This fixing can be achieved by any means, and in particular by means of at least one fixing tab. The fixing can be achieved by means of welding or by means of screwing, in particular using at least one self-tapping screw. The self-tapping screws are advantageous with respect to normal screws in that they do not require preliminary drilling at the location where they are fixed, and thus the use thereof facilitates the assembly of the device. The screws also allow for more rapid fixing than by means of welding.

Furthermore, the different members (15, 17, 19, 21) can have a cross section of any desired shape, and in particular of a rectangular, circular, or triangular shape, and preferably a rectangular or circular shape.

According to a preferred embodiment shown in FIG. 2, the device further comprises an underbody screen 23, and the member or at least one of the members is mounted or formed integrally with the screen 23. A screen 23 of this kind both provides additional rigidity to the device, and also provides an aerodynamic function, limiting the formation of turbulence below the engine. The device thus has a dual function.

Figure 3:
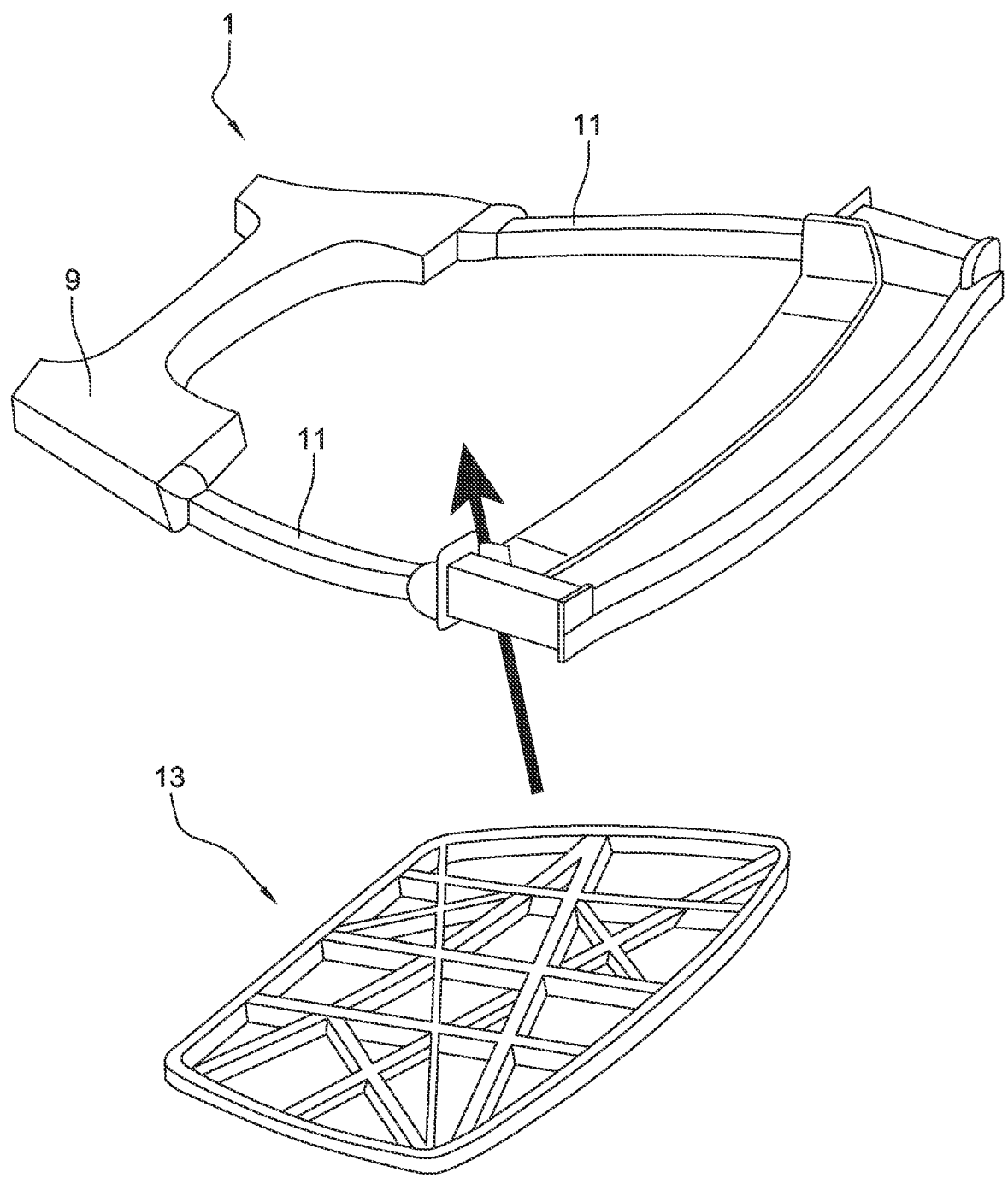
FIG. 3 is a separate view of a front part of a vehicle and of an underbody screen.

As can be seen in FIG. 3, the screen can be mounted on a front part of a pre-existing vehicle, without the need to modify the vehicle. The invention can therefore be easily adapted to any type of vehicle. Furthermore, the absorption device according to the invention may or may not be mounted on a series of vehicles without the need for major modifications to the production line.

The presence of a device of this kind furthermore makes it possible to reduce the thickness of the walls or of the member or members. In particular, when the members are made of metal, they can be of a thickness of between 1.0 and 2.0 mm, preferably between 1.3 and 1.8 mm. When the members are made of a composite material, the thickness thereof can be between 3.0 and 5.0 mm, preferably between 3.5 and 4.5 mm.

Preferably, the underbody screen 23 covers at least 30% of the dimensions of the gap separating the two extensions 11, furthermore preferably at least 50%, preferably at least 70%, more preferably at least 90%. According to a preferred embodiment, the underbody screen 23 covers at least the dimensions of the gap separating the two extensions 11.

According to an embodiment, the screen 23 comprises at least one lateral edge that borders one of the two extensions 11 and against which the member or at least one of the members rests. Alternatively, or in an intermediate manner, a member that is integral with the screen 23 can extend from the lateral edge. Preferably, the lateral edge is in contact with the extension 11.

The screen 23 can be fixed to the extensions 11 and/or to the fixing plates. This fixing can be achieved by any means, and in particular by means of welding or by means of screwing, for example using at least one self-tapping screw.

The screen 23 and the different members (15, 17, 19, 21) can be formed of a plastic material or of a composite material, preferably a composite material. The composite material can be a thermoplastic or a thermosetting composite material. As used herein, composite materials are defined as having a polymer matrix and one or more reinforcement elements. The reinforcement elements comprise or are formed by fibers or a mixture of fibers selected from glass, carbon, ceramic or graphite fibers, or natural fibers such as flax, hemp or bamboo fibers, or organic polymers such as polyester fibers. Preferably, the fibers of the reinforcement elements are glass fibers.

The thermoplastic polymer matrix is advantageously selected from one or more materials selected from polypropylenes (PP), polyphthalamides (PPA), polyether ether ketones (PEEK), polyphenylene sulfides (PPS), polyamide-imides (PAI), polyetherimides (PEI), polyarylamides (PAA), or polyamides (PA), for example polyamide 6 (PA 6 or polycaprolactam) or polyamide 6.6 (PA 6.6 or polyhexamethylene adipamide).

The thermosetting polymer matrix is advantageously selected from the unsaturated polyesters, the polyurethanes, the vinyl esters or the polyepoxides.

Alternatively, the different members (15, 17, 19, 21) can be formed of metal such as steel or aluminum, preferably of aluminum.

When the screen 23 comprises at least one edge that borders one of the two extensions 11, and the member or at least one of the members is in contact with the edge, the use of a thermoplastic material or a composite material allows for the edge to act as a shock-absorber in the event of a frontal impact, before the members are stressed. As a result, the absorption device 13 performs better with respect to its energy absorption.

Preferably, the underbody screen comprises a network of ribs. A network of this kind makes it possible to increase the rigidity of the screen, and thus the rigidity of the absorption device. Preferably again, the network of ribs comprises a set of ribs in the form of a honeycomb.

The invention claimed is:

1. A motor vehicle comprising two side members and a cradle from which two extensions, separated by a gap, extend towards a front of said vehicle, each extension stretching below one of the side members and being connected to said side member by a support element, the vehicle further comprising a force absorbing device arranged in said gap and between said two extensions;
   wherein the force absorbing device comprises at least one transverse member that stretches from one extension to the other;
   wherein the force absorbing device further comprises an underbody screen, and in that at least one of the transverse or side members is mounted on said screen or is integral with said screen; and
   wherein the extensions are fixed to fixing plates at the front, and, wherein the underbody screen is fixed to at least one extension and/or to at least one fixing plate.

2. The vehicle according to claim 1, wherein the at least one transverse member is arranged so as to be non-perpendicular to the longitudinal axis of the vehicle, and/or the transverse member or at least one of the transverse members is arranged so as to be perpendicular to the longitudinal axis of the vehicle.

3. The vehicle according to claim 1, wherein the force absorbing device comprises at least first and second transverse members and at least one intermediate member that extends from the first transverse member to the second transverse member.

4. The vehicle according to claim 1, wherein the force absorbing device further comprises at least one intermediate member that stretches between the at least one transverse member and one extension.

5. The vehicle according to claim 1, wherein at least one of the side or transverse members is formed of metal or of a composite material.

6. The vehicle according to claim 1, wherein the underbody screen comprises at least one lateral edge that borders one of the extensions and against which at least one of the side or transverse members rests.

* * * * *